United States Patent [19]

Hsu et al.

[11] Patent Number: 5,063,288
[45] Date of Patent: Nov. 5, 1991

[54] APPARATUS FOR SECURING A CONFINED SPACE WITH A LASER EMISSION

[76] Inventors: Chi-Hsueh Hsu, 4F, No. 144, Chu Lin Road, Yung Ho; Chin-Fen Huang, 2F, No. 3, Nung 13, Lane 38, Tien Yu St., Shih Lin; Chun-Hsien Wang, 3F, No. 86, Mu Hsin Rd., Sec. 3, all of Taipei, Taiwan

[21] Appl. No.: 397,248
[22] Filed: Aug. 23, 1989
[51] Int. Cl.⁵ .................................... G01V 9/04
[52] U.S. Cl. ........................ 250/221; 250/222.1; 340/557
[58] Field of Search ............... 250/221, 222.1; 340/555–557

[56] References Cited

U.S. PATENT DOCUMENTS

| | | |
|---|---|---|
| 3,335,285 | 8/1967 | Gally, Jr. et al. .................. 340/557 |
| 3,623,057 | 5/1969 | Hedlin et al. ..................... 340/557 |
| 3,688,298 | 8/1972 | Miller et al. ..................... 340/557 |
| 3,987,428 | 10/1976 | Todeschini ....................... 340/557 |

FOREIGN PATENT DOCUMENTS

| | | | |
|---|---|---|---|
| 84/04986 | 12/1984 | PCT Int'l Appl. ............... | 340/557 |
| 1229100 | 5/1986 | U.S.S.R. ............................ | 340/556 |

Primary Examiner—David C. Nelms
Assistant Examiner—Stephone B. Allen
Attorney, Agent, or Firm—Morton J. Rosenberg; David I. Klein

[57] ABSTRACT

A laser security for securing a confined space including means for generating laser ray, means for converting the laser beam into divergent laser plane along a vertical plane, reflection means properly arranged so as to sequentially reflect the laser plane into a formation confining a space, termination means for sensing the reflected laser rays of the laser plane. Whenever any of the laser vertical securing planes is shielded or interrupted by an intruder, said intruder will be detected by the sensor means and further sound warning signals after a identification process.

2 Claims, 14 Drawing Sheets

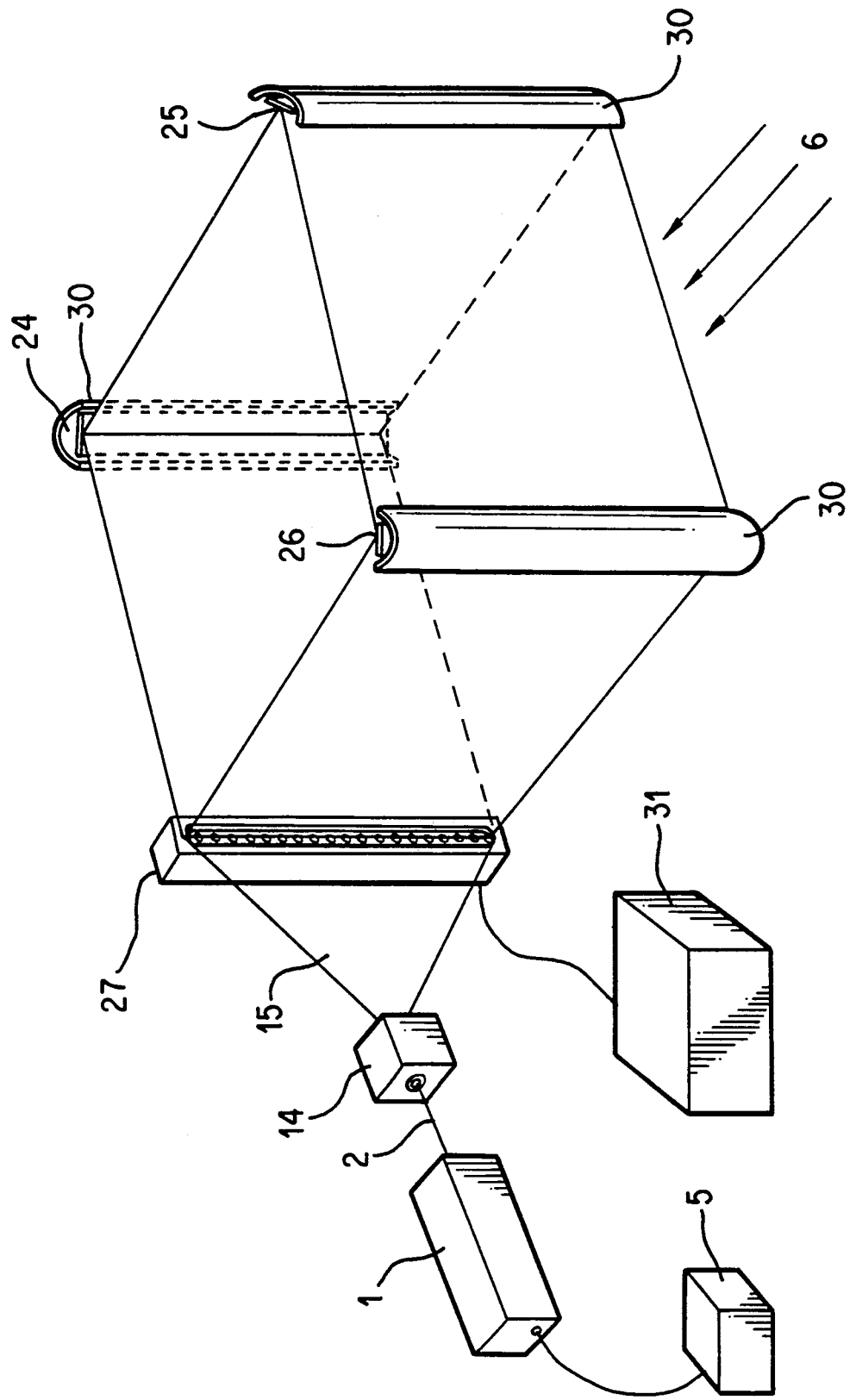

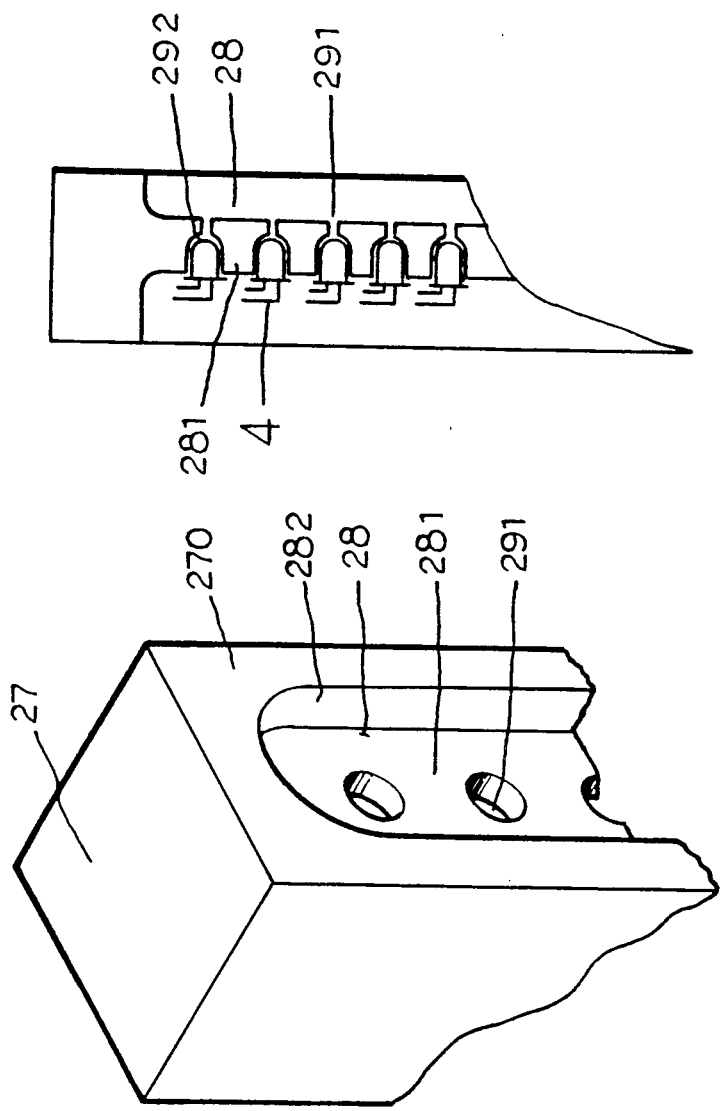

5,063,288

APPARATUS FOR SECURING A CONFINED SPACE WITH A LASER EMISSION

BACKGROUND OF THE INVENTION

This invention relates to a detective security system, and particularly to a laser detective security system.

Conventionally, a supersonic security system is used for protecting any illegal intrusion. The supersonic security system comprises a supersonic receiver and some electronic eyes which issue supersonic waves to an alert area. When this area is illegally intruded or any object within this detective range is moved, the receiver will produce an inducted signal in response to the shock of frequency to sound alarms through horns or speakers of the system.

Alternatively, as shown in FIG. 1, a series of laser detective devices powered by an electric power source 5 and each having a laser generator or laser tube 1 and a sensor 4 are arranged along a passage or confined area 7. Said laser tube 1 will emit a laser ray 2 across the passage or area 7 to be received by the corresponding sensor 4. Whenever any one of the laser rays 2 is interrupted by illegal intruder 6, an inducted signal will be produced in response to the ray interruption to sound alarms through horns or speakers of the security system.

It is found disadvantageous that the protection web composed of a plurality of laser rays is not tight enough. An experienced intruder with evil intention may intrude himself into the passage or alert area without interrupting any of the laser rays. That means the security system will perform no function for protecting the alert area or passage.

OBJECT OF THE INVENTION

It is accordingly a primary object of this invention to provide an improved security system that overcomes the foregoing defects associated with prior arts.

BRIEF DESCRIPTION OF DRAWINGS

FIG. 4 is a perspective view of this invention showing a preferred embodiment thereof;

FIG. 5A is a perspective view of the sensor block used in this invention;

FIG. 5B is a partially enlarged perspective view of the sensor block shown in FIG. 5A;

FIG. 5C is a partially cross-sectional view showing the sensor block evenly fitted with sensors;

DETAILED DESCRIPTION OF THE PREFERRED EMBODIMENT

Figure 1:
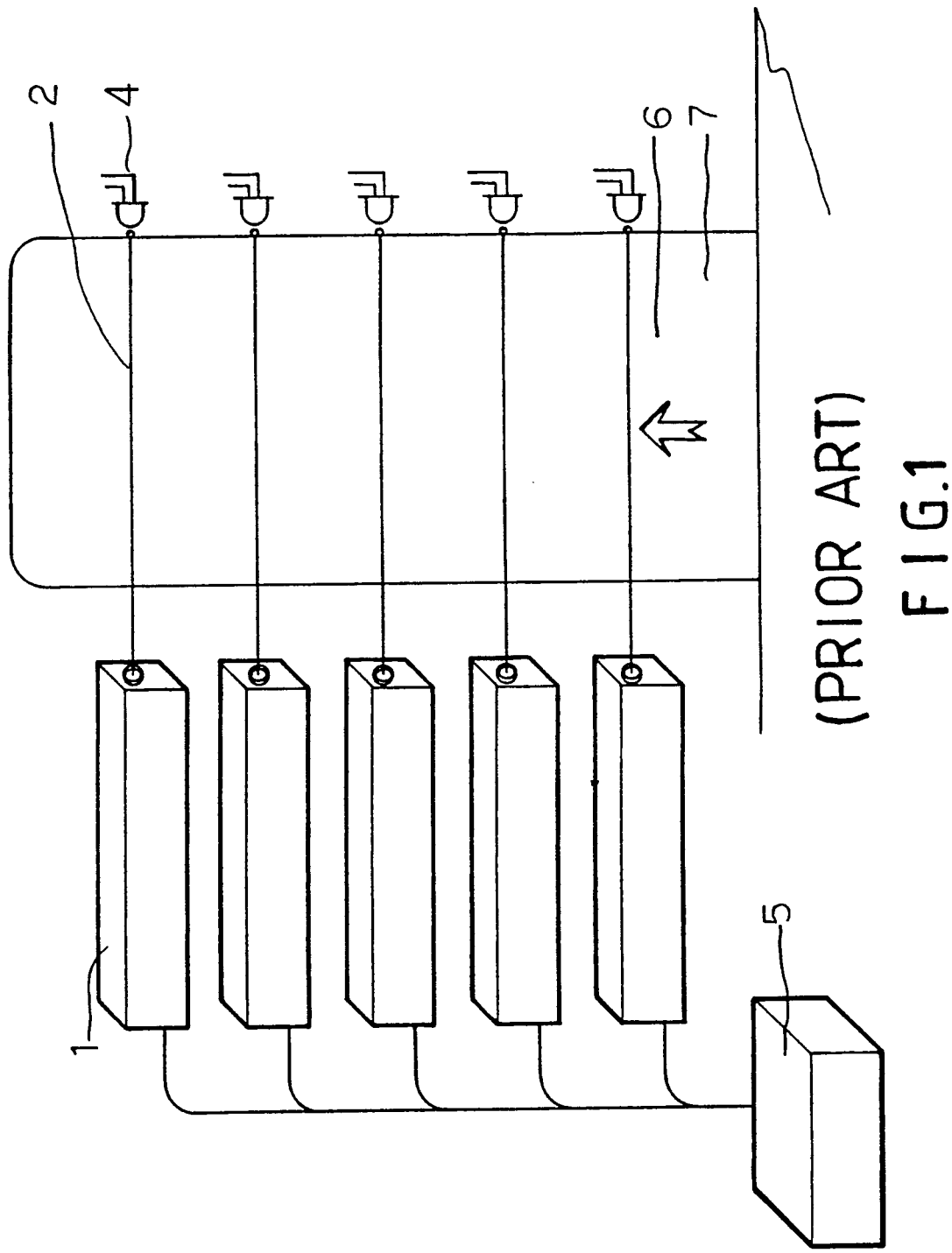
FIG. 1 is an arrangement of a conventional laser security system.
Figure 2:
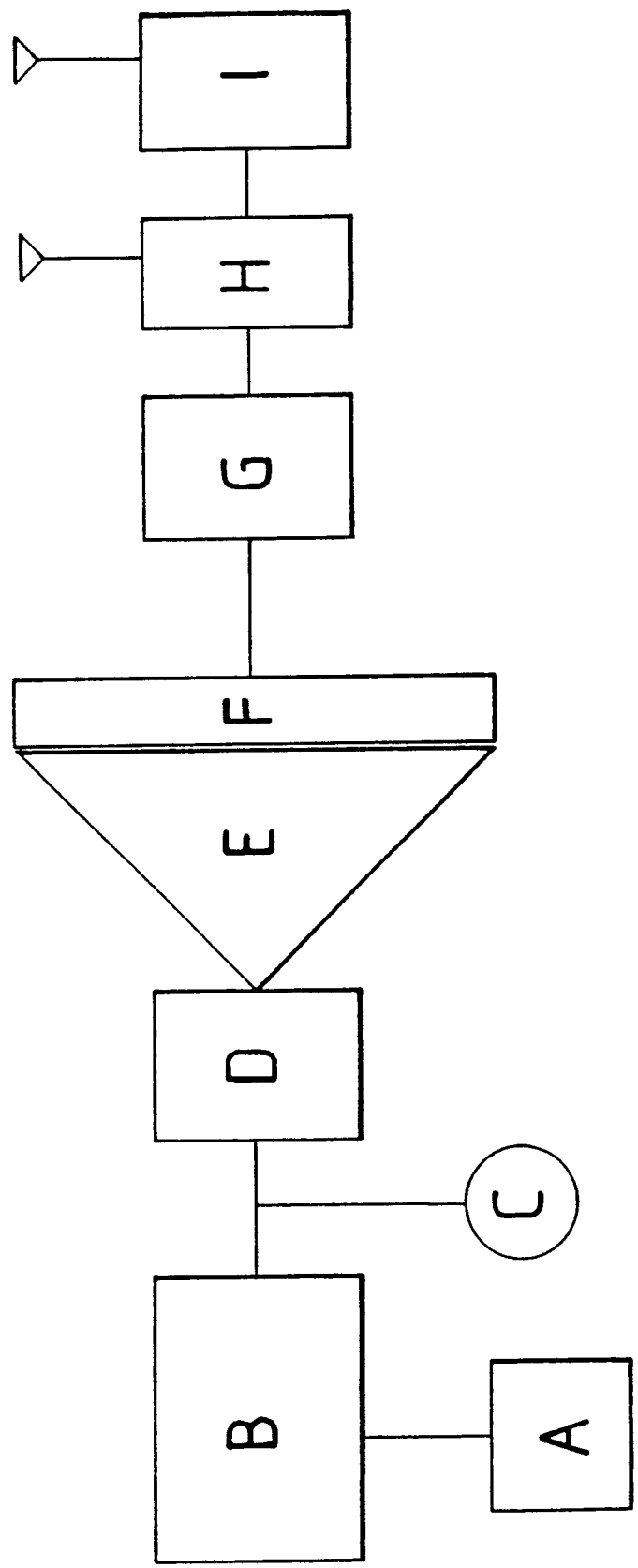
FIG. 2 is a flow chart of a laser security method according to the present invention.

Referring now to FIG. 2, the laser security system includes a laser generator or tube indicated by a capital B being electrically connected to an electrical power source indicated by a capital A and emitting a laser ray indicated by a capital C to a diverging lens or a light scattering device indicated by a capital D. The light scattering device D converts the laser beam C into a laser sector or triangle E along a vertical plane. The laser sector or triangle E projects onto an up-raised sensor block indicated by a capital F. The output end of the sensor block F is connected to an identification computer indicated by a capital G. This identification computer G can identify the intruder by, for example, automatically measuring the size and speed of the intruder as the laser sector or triangle is partially interrupted by the intruder and determines to warn the guard or owner by sending an inducted signal to a control center indicated by a capital H. The control center H will send a warning radio signal to the guard or owner through a Bi—Bi receiver indicated by a capital I and carried along with the guard or owner and/or sound alarms to give a warning.

Figure 3:
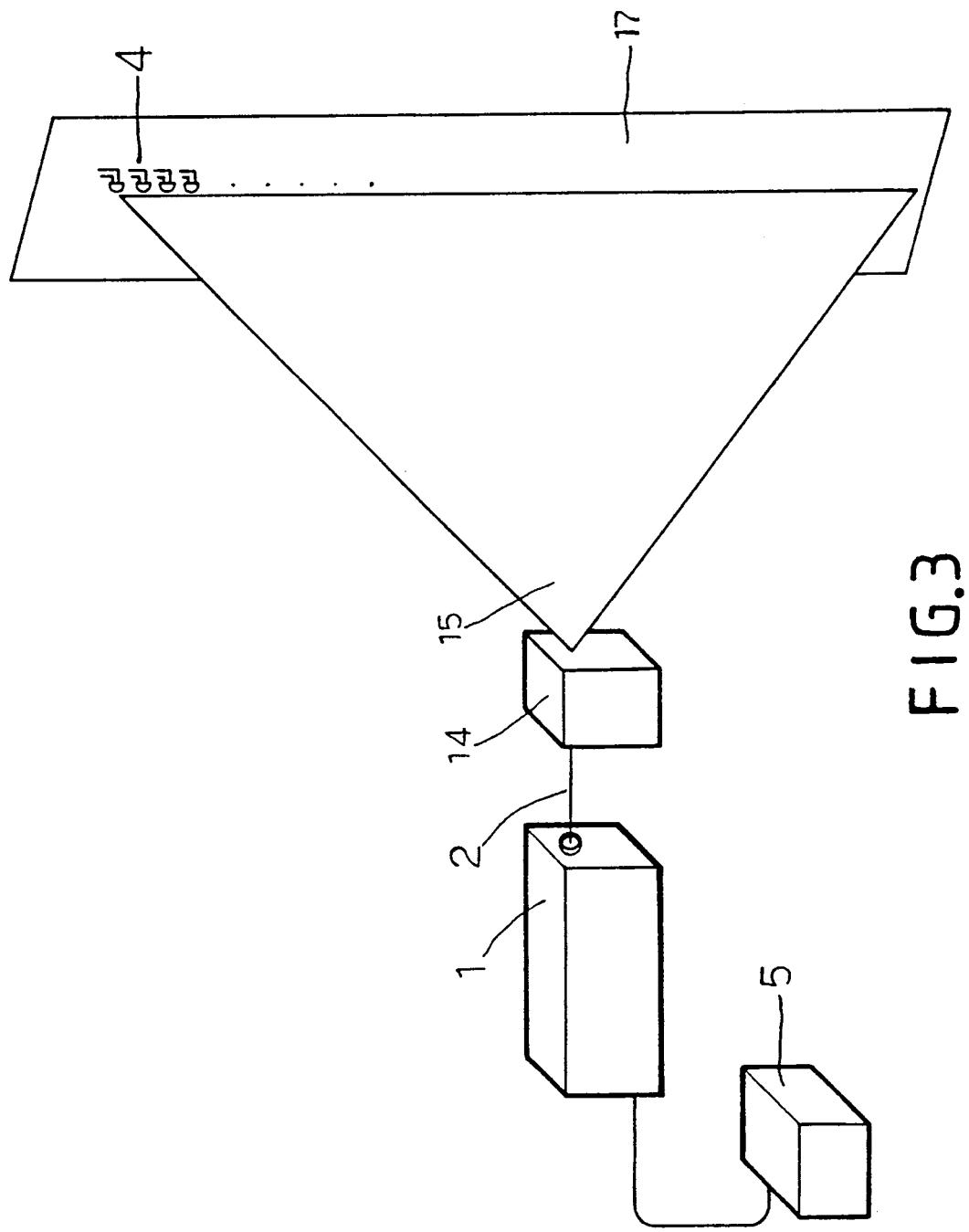
FIG. 3 is a perspective view of this invention showing a laser beam converted into a laser sector along a vertical plane and projecting on to a series of sensors vertically in alignment and fitted in an upraised sensor block.

As shown in FIG. 3, the laser security system comprises a laser generator or tube 1 electrically connected to an electrical power source 5 and emitting a laser ray 2. The laser ray 2 is scattered and thus converted into a laser triangle 15 along a vertical plane through a diverging lens or light scattering device 14. The laser triangle 15 may directly project on to a series of sensors 4 vertically in alignment on an upraised post or board 17 so as to form a triangular vertical protection plane 15.

Figure 10:
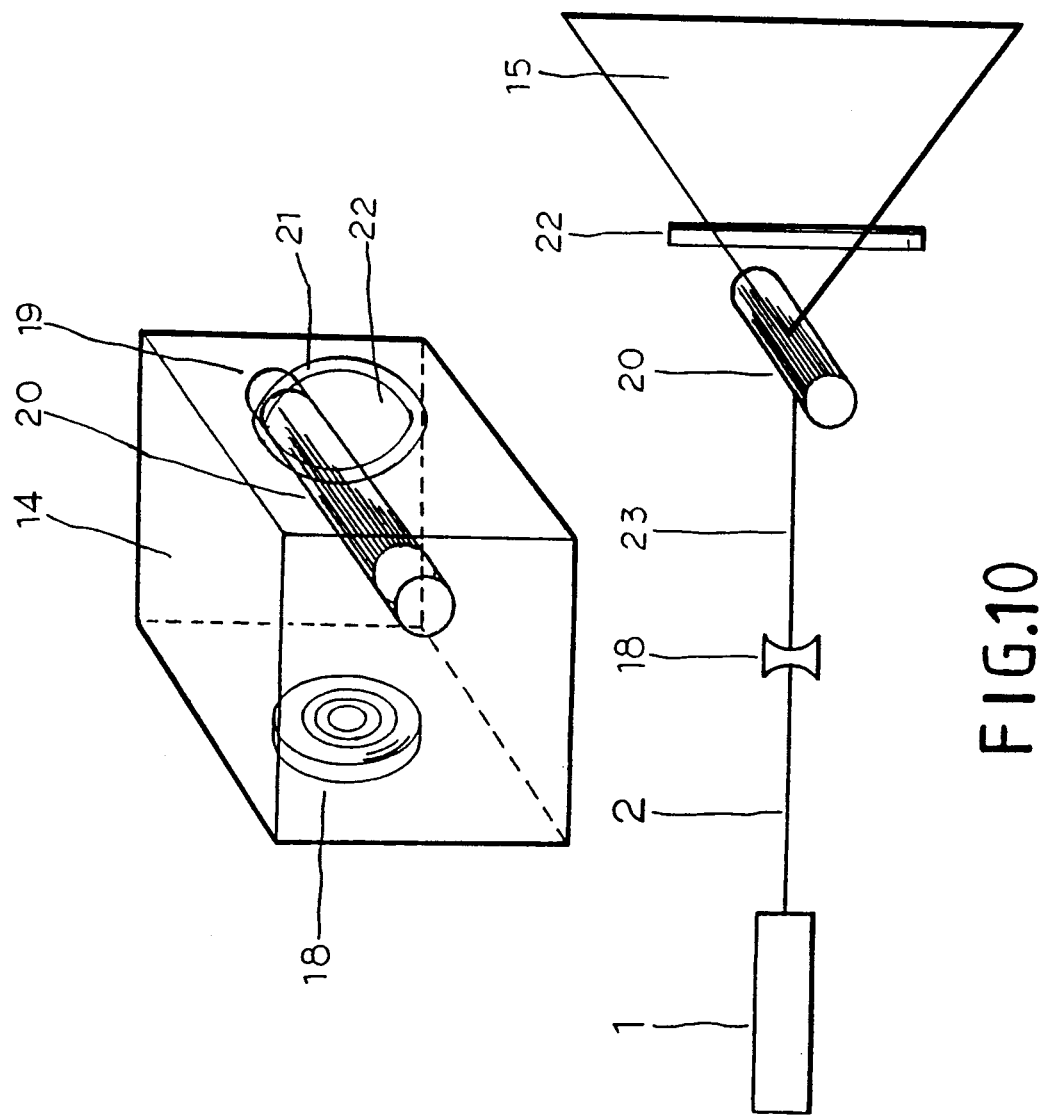
FIG. 10 is a perspective view of a light scattering device for converting a laser beam into a laser sector.

As shown in FIG. 10, the light scattering device 14 for converting a laser beam 2 into a laser sector 15 includes a casing 14, a transparent pole 20 transversely horizontally fitted in the inner space of the casing 14 through openings 19 in a pair of opposed vertical side walls. The laser ray 2 from the laser tube 1 is aimed at the transparent pole through a hole in vertical side wall of the casing, passing through the transparent pole 20 and thus scattered into a laser sector along a vertical plane. Said hole in the vertical side wall of the casing 14 can further be fitted with a concave lens 18 so as to convert the laser beam into a laser beam 23 of finer in diameter before reaching the transparent pole 20. Reflection mirrors 21, 22 can also be provided on the vertical side wall of the casing 14 for reflecting away of unnecessary lights.

An enhancing security function of the laser security system for protecting a confined space is effected by sequential reflections. As shown in FIG. 4, three supporters 30, each carrying a mirror 24, 25 or 26, and a sensor block 27 are up-raised from four corners of a rectangular or square area. The light scattering device 14 is located next to the sensor block 27 and projects the laser sector or triangle 15 on to a first mirror 24 carried by a supporter 30 next to the sensor block 27. The first mirror 24 is so arranged that a right-angled reflection is performed. Moreover, the second mirror 25 and the third mirror 26 are properly arranged so that sequential right-angled reflections are performed by means of the second mirror 25 and the third mirror 26 and the laser light reflected by the third mirror 26 is eventually projects on to the sensor block 27 so as to formed a confined alert space enclosed with laser vertical planes.

As shown in FIG. 5A through 5C, the sensor block 27 has an elongated side wall 270 formed with a groove 28, which is defined by a bottom board 281 and a surrounding side wall 282, along the side wall 270 and a plurality of openings 291 are evenly formed in the bottom board 281 of the groove 28. A plurality of chambers 292 in correspondence and communication with the openings 291 are formed in the bottom board 281. Each chamber 292 has an opening opposed to the opening 291 and is press-fitted with a sensor 4 with a portion of the sensor 4 barely exposing to the open air through the corresponding opening 291. Said sensors 4 are connected, in parallel, to the identification computer 31.

Return to FIG. 4, as the openings 291 in the sensor block 27 face the reflecting laser rays from the third mirror 26, the reflected laser rays are thus detected by the sensors 4. Furthermore, the groove 28 and the openings 291 can prevent the sensors from malfunction that may be conducted by disturbance of any extra ray. A tatrahedron security web is thus accomplished. Any intruder 6 who moves through any of the four vertical laser planes will interrupt the laser light and thus detected.

Alternatively, a variety of solid geometric enclosed security web can be formed by properly arranging upraised reflection mirrors and the sensor block in a way similar to the embodiment described above.

The identification computer 31 is a conventional computer system which is functional of, for example identifying the intruder 6 who interrupts a laser protection plane by automatically measuring size and/or speed of the intruder and may produce an inducted signal to the control center H when the intruder is found harmful.

Figure 6A:
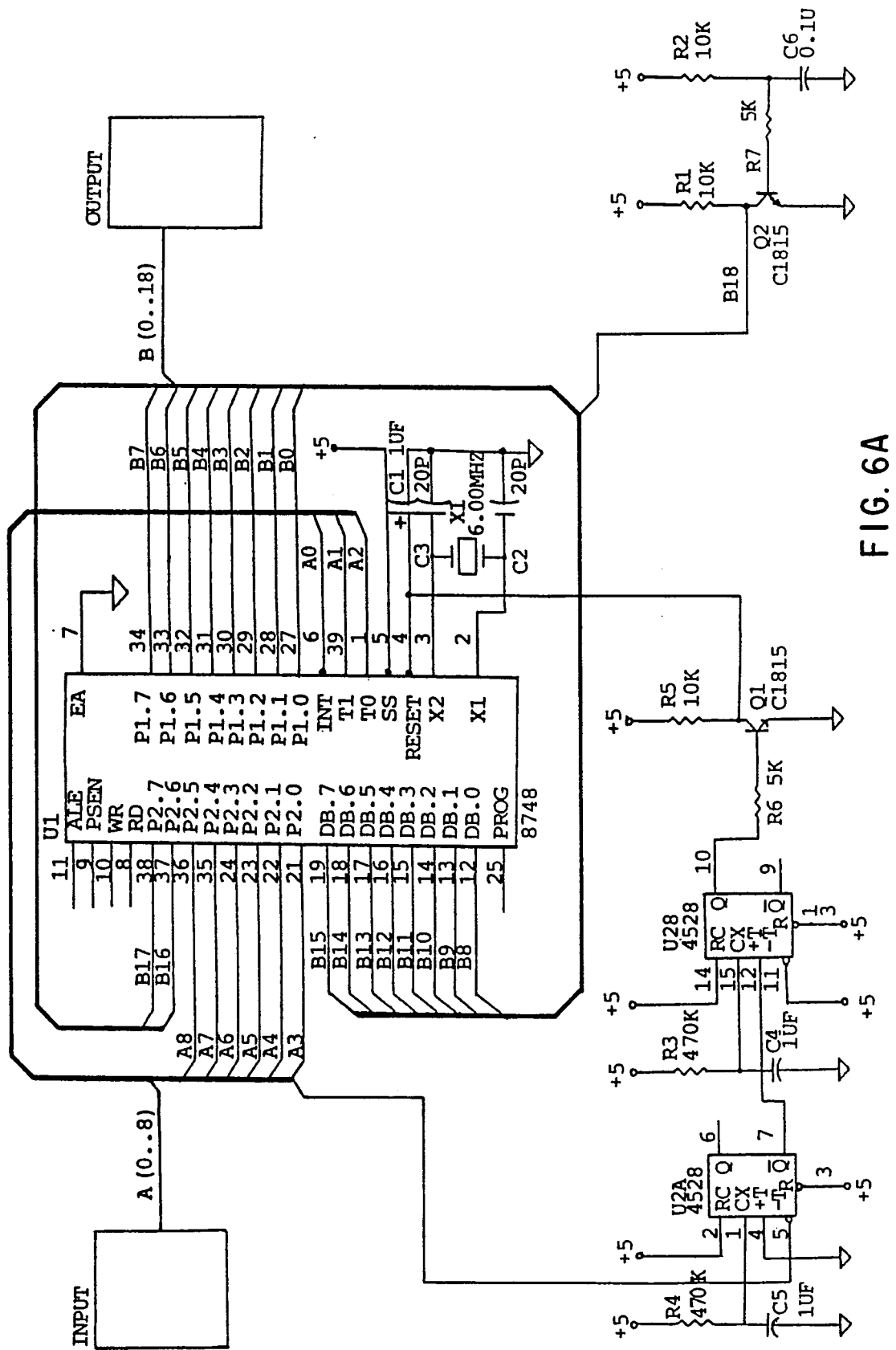
FIGS. 6A and 6B show a known electric circuit used in the identification computer of this invention.
Figure 6B:
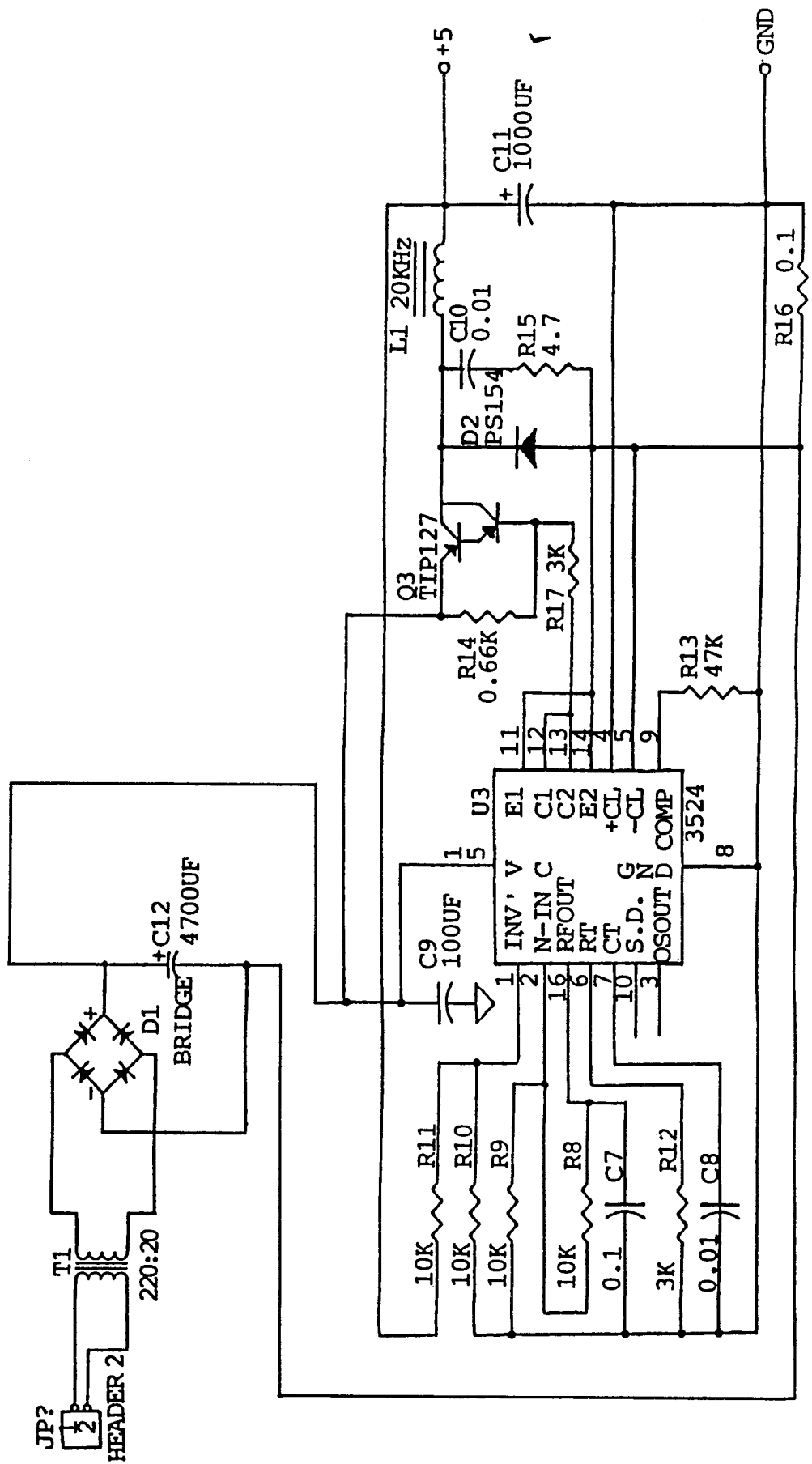
Figure 7A:
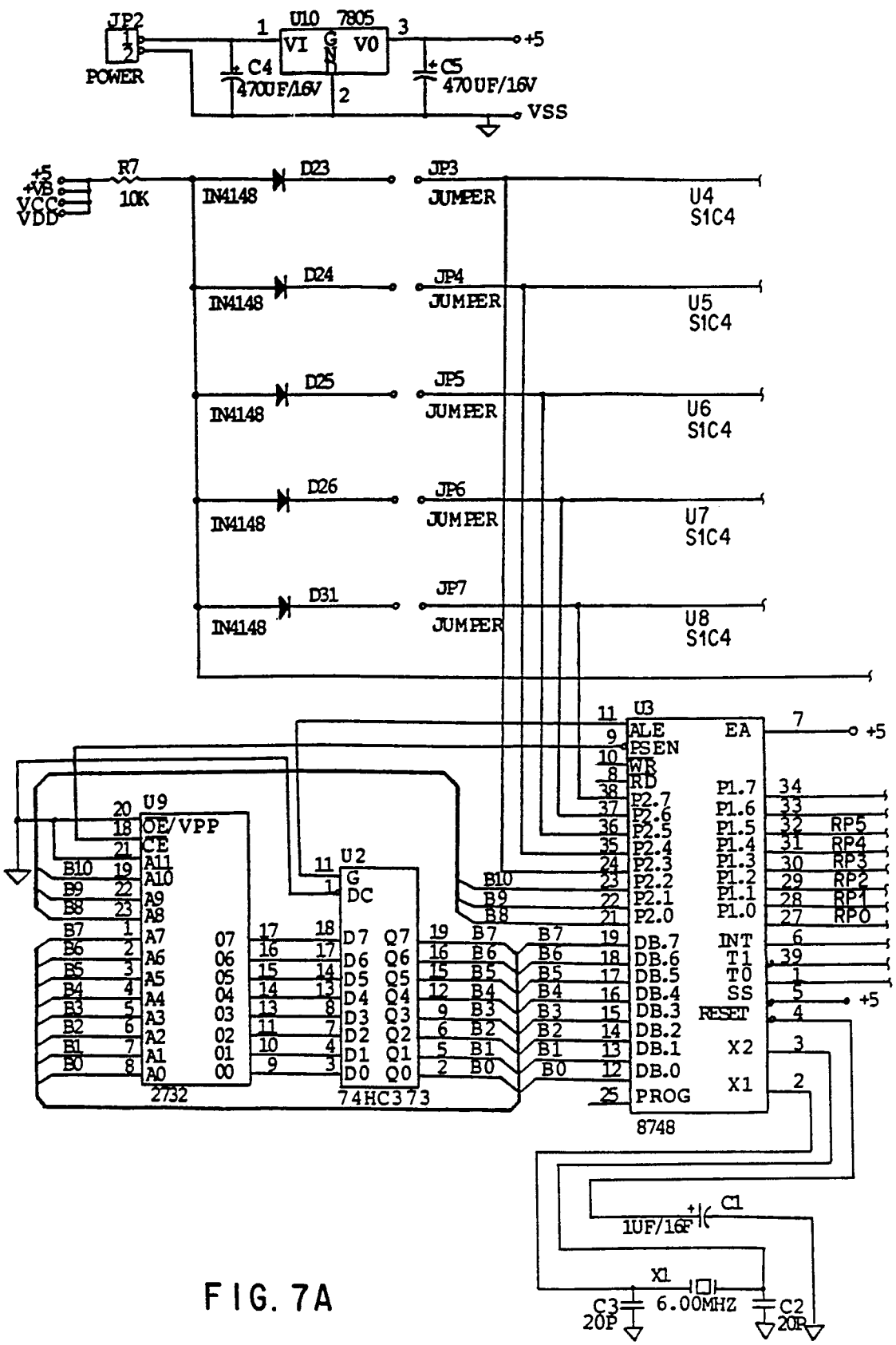
FIGS. 7A and 7B show a known electric circuit used, in combination, in the identification computer of this invention.
Figure 7B:
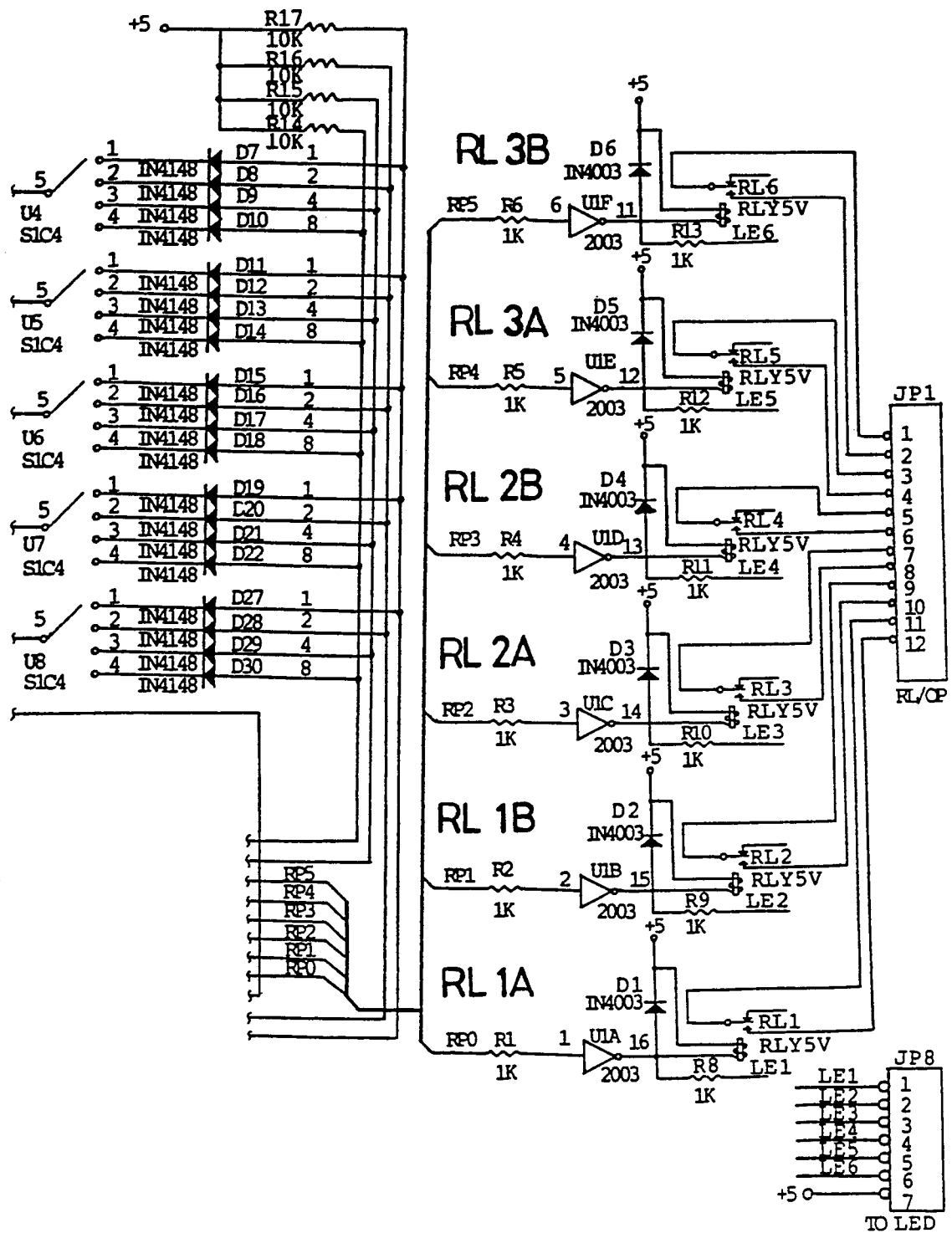
Figure 8A:
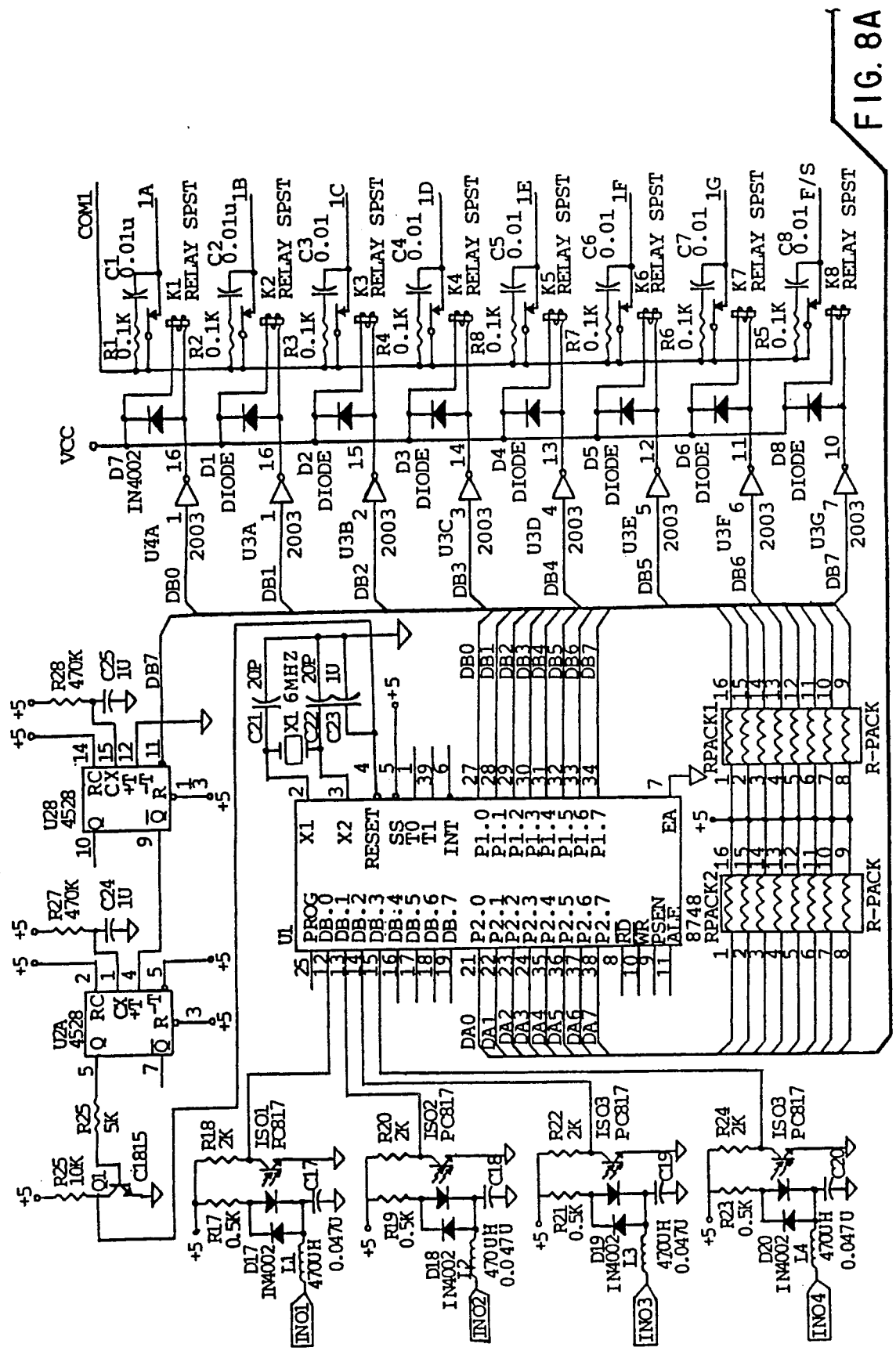
FIGS. 8A and 8B show a known electric circuit used in the control center of this invention.
Figure 8B:
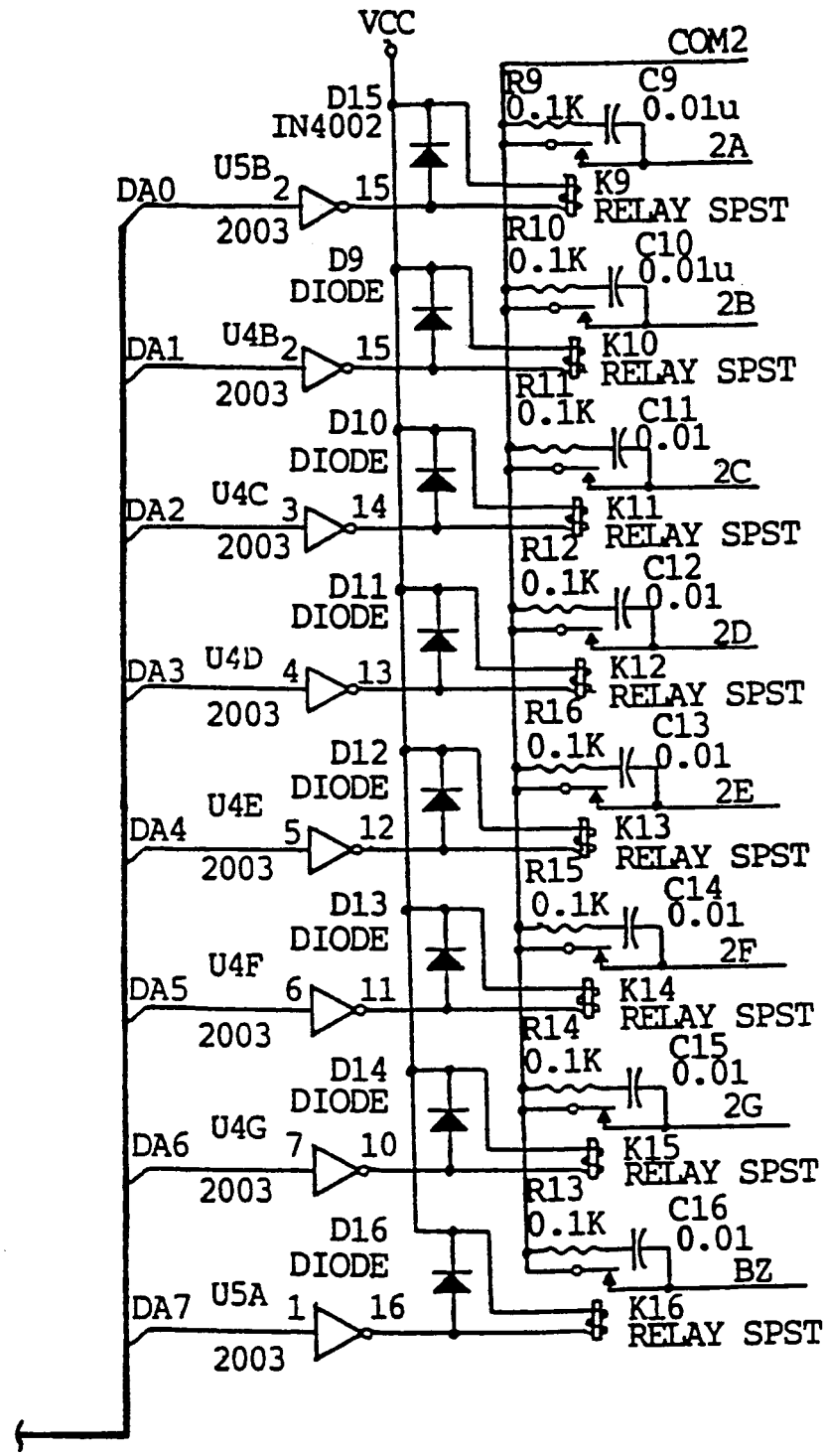
Figure 8C:
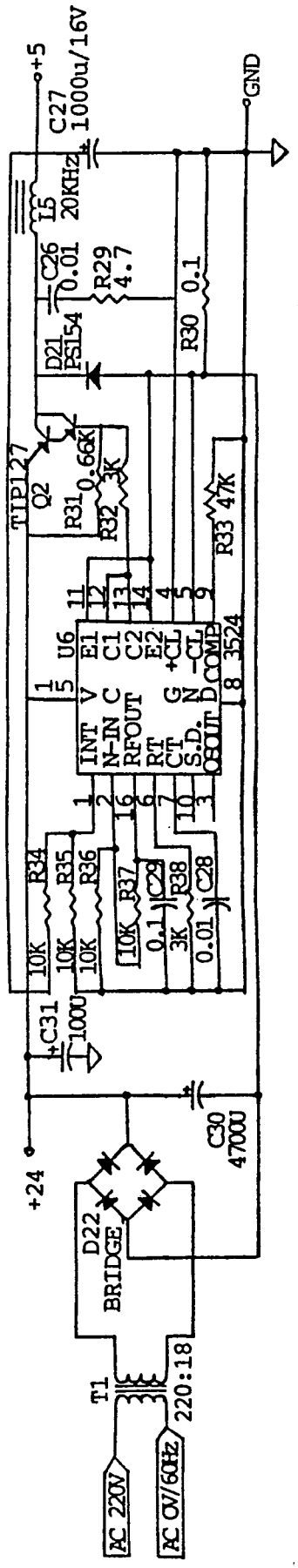
Figure 8D:
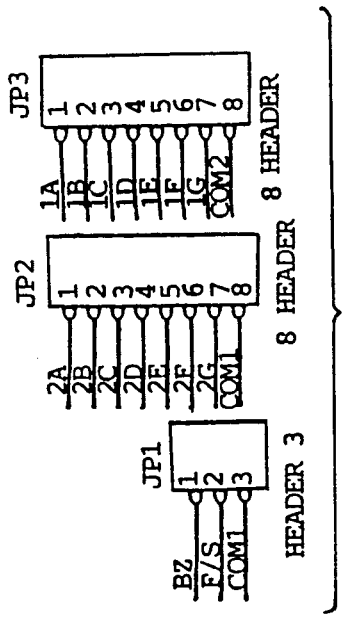

FIG. 6 shows a known electric circuit used in the identification computer 31 as an unit which functions in producing an inducted signal to warn as any of the laser security plane is partially or entirely shielded or interrupted. FIG. 7 shows a known electric circuit used in the identification computer 31 as an unit which functions in identifying the intruder by measuring size and speed of the intruder. FIG. 8 shows a known electric circuit used in the control center H which can automatically communicate warning signals to the guard or owner of the confined space who may be away from the alert space through radio operation or other applicable means as the control center receives the signals from the identification computer 31.

Figure 9:
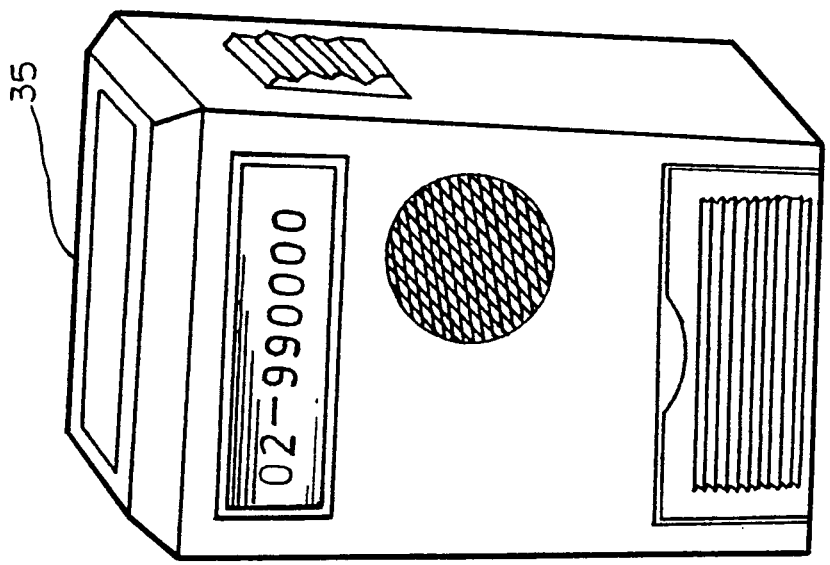
FIG. 9 is a miniature receiver serving as a warning device used in this invention.

As shown in FIG. 9, a miniature receiver 35 adapted to be carried along with the guard or owner and usually named as a Bi—Bi Call is recommended in this invention to be a warning device. It will sound Bi—Bi warning signal as it has received radio signal from the control center H.

This invention is especially applicable in securing a wide range of military base on the ground or even under water. There will be effective detection of any offensive intrusion with a few visible facilities.

Many modifications of this invention, within the scope of the appended claim, may be made without departing from the spirit of this invention.

What is claimed is:

1. An apparatus for securing a confined space with a laser emission comprising:
   a laser generator or tube for emitting a laser ray; a laser scattering device for converting said laser ray into a device for converting said laser ray into a divergent laser plane along a vertical plane;
   reflection means spacedly arranged for sequentially reflecting said laser plane to form sequential laser planes therebetween; a sensor means having a plurality of sensor units in vertical alignment and facing reflecting laser plane from a last reflection member of the reflection means for detecting any intruder by interrupting any of the laser planes; identification means connected with sensors of the sensor means for automatically measuring a size and intrusion speed of the detected intruder;
   means in combination with said measurement means for producing an inducted signal after a process of computation; means connected with the signal means to send out warning signals at least including radio communication signals as having received said inducted signal; and
   a miniature receiver adapted to be carried along by a owner and sound warning signals upon having recieved said radio communication signals.

2. The apparatus as claimed in claim 1, wherein said identification means is an identification computer.

* * * * *